3,111,840
Patented Nov. 26, 1963

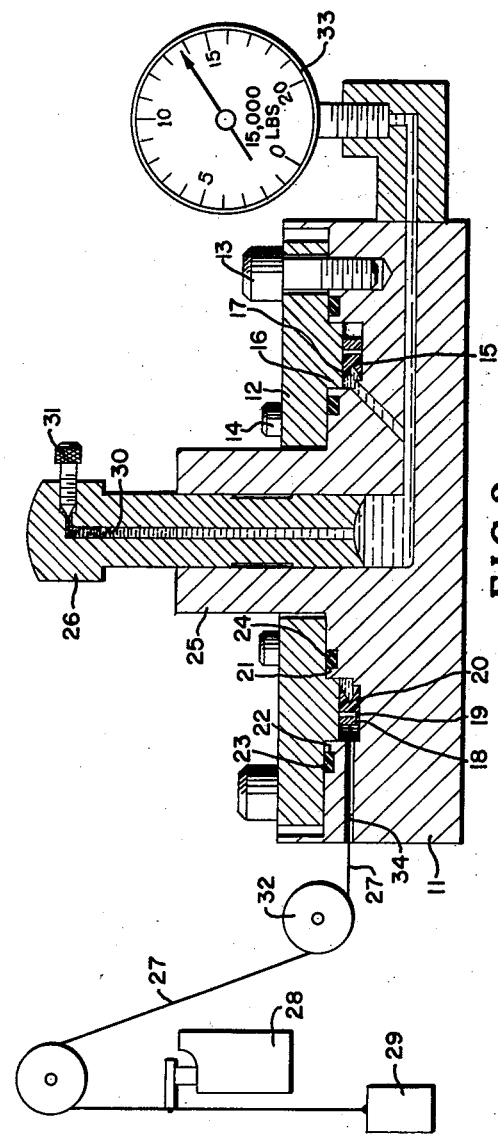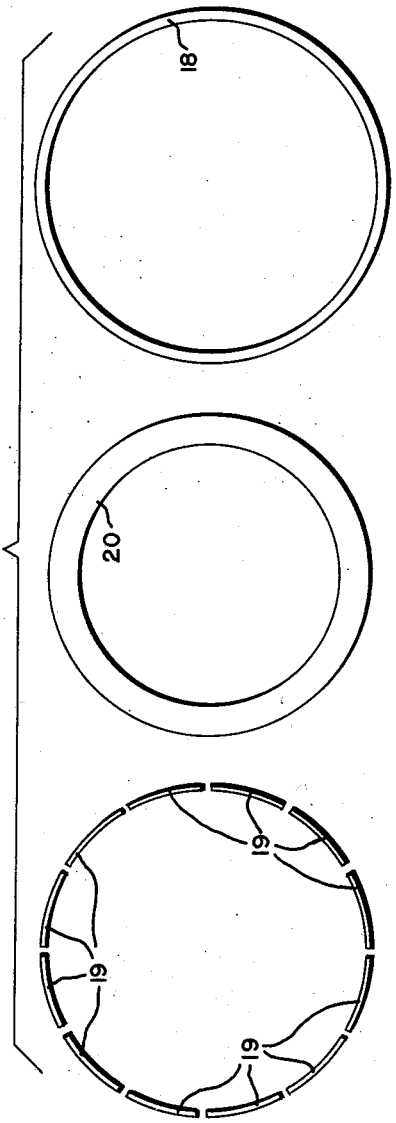

3,111,840
HYDRAULIC TENSILE TESTER FOR RING STRUCTURES
Fredrick R. Barnet, Kensington, and Virgil I. Milani, Silver Spring, Md., assignors to the United States of America as represented by the Secretary of the Navy
Filed Apr. 15, 1960, Ser. No. 22,652
2 Claims. (Cl. 73—89)
(Granted under Title 35, U.S. Code (1952), sec. 266)

The invention described herein may be manufactured and used by or for the Government of the United States of America for governmental purposes without the payment of any royalties thereon or therefor.

This invention relates generally to tensile testing equipment and more particularly to a testing machine whereby a ring member or a thin section of a tube may be tested for tensile properties.

In the field of testing and especially in the testing of a strip of plastic reinforced glass roving it has been very difficult to test the tensile properties because the specimen tends to break at the specimen holder. Ring-shaped members were tested by slipping the ring member to be tested over two steel half discs and then the two half discs were pulled in opposite directions until failure of the ring occurred. While this method was useable the results were not accurate. The ring almost always broke at a point between the two half discs. The reason for breaking at this point is that the ring tends to bind along the periphery of the two half discs therefor only stretching in the gap between the discs. The ring member straightens out in the area in between the two half discs resulting in the inside portion of the member being under tension and the outside portion of the member being under compression. As a result of this test, the ring member always began breaking from the inside and worked its way out to the periphery of the ring. This, therefore, failed to provide a true tensile test for the ring.

Although the split disc method of testing has served the general purpose, it has not proved entirely satisfactory for the reasons mentioned above. Those concerned with the development of this art have long recognized the need for a tester that is capable of accurately testing the tensile properties of ring members. The present invention fulfills this need.

The present invention has overcome the objection attributed to the prior art devices by providing a gradually increasing pressure to be exerted uniformly against the entire inside periphery of the ring until it ruptures. By this method the modulus of elasticity as well as the ultimate tensile strength may be accurately obtained.

An object of the present invention is to provide a new and improved ring tester.

It is another object to provide a new and improved ring tester wherein a uniform pressure may be exerted against the entire inside periphery of the ring member.

It is still another object to provide a new and improved ring tester capable of testing accurately the ultimate tensile strength of a ring member.

It is a further object to provide a new and improved ring tester capable of accurately measuring the modulus of elasticity of a ring member.

It is still a further object to provide a new and improved process for testing a circular ring member.

Other objects and many of the attendant advantages of this invention will be readily appreciated as the same becomes better understood by reference to the following detailed description when considered in connection with the accompanying drawing in which like reference numerals designate like or similar parts throughout the figures thereof and wherein:

FIG. 1 is a sectional view of the ring tester with the extensometer connected thereto; and
FIG. 2 is an exploded view of the ring member to be tested with the shim members and the obturator seal ring.

Referring now to FIG. 1 which discloses a base fixture 11 with the lid member 12 which may be bolted in place by a plurality of bolts 13, for example eight, on the outside periphery and a plurality of smaller bolts 14, for example eight, located on the inside periphery. The base fixture 11 has a circular central well or trough 15. The lid has a circular lip member 16 that extends into the trough section partially filling the trough. The remaining unfilled portion 17 of the trough 15 will be filled by the specimen to be tested.

As is more clearly shown in FIG. 2, the specimen to be tested consists of a circular member 18, for example, a glass reinforced plastic ring. The width of the circular member 18 is 0.001 to 0.005 of an inch less than the unfilled portion 17 of trough 15. A plurality of steel bearing members 19, for example six or twelve, with a width of about 10 mils less than the width of the circular member 18 are used in the test. The steel shim members are placed end to end around the inside periphery of the circular member completely covering the inside periphery of the circular member. An oil sealing member 20, for example, a rubber O ring or other obturator ring having an outside diameter equal to the inside diameter of the circular member to be tested is placed inside the steel shims. On the base member 11 two additional small circular grooves 21 and 22 are located on either side of trough 15. The grooves are located on the surface of base 11 and will be covered by lid 12. The circular grooves contain O rings 23 and 24 respectively of a size that will be squeezed in such a manner as to form an oil seal when the lid 12 is bolted into position. At the center of the base fixture 11 is a circular sleeve member 25 which is formed preferably integral with the base member. The sleeve member has a venting orifice leading from the base of the sleeve into the unfilled portion 17 of trough 15. Another venting orifice from the base of sleeve member 25 leads to an oil pressure gauge 33 located outside the base. Oil is poured into sleeve member 25 and a circular central plunger 26 is inserted into the sleeve 25. The central plunger 26 has an outside diameter substantially the same as the inside diameter of sleeve member 25 so that substantial pressure may be exerted against the plunger without loss of oil between the sleeve and plunger. The plunger 26 has a venting orifice 30 near the top thereof so that any air in the oil system may be removed by opening the bleed valve 31. A wire 27 or a steel band is wound once around the outside of the ring member 18 with one end connected to base member 11, the other end extending through a hole 34 in the base member 11 and being connected to an extensometer 28. The end connected to the extensometer is held taut by a weight member 29 or it may be held by a spring member. An electrical recorder may be connected to the extensometer for permanently recording the extent of radial expansion of the circular member.

The process of utilizing the hydraulic tester will now be described. The circular member 18 to be tested is placed in the trough 15. A plurality of metal bearings 19 are sandwiched in between the inside periphery of member 18 and the outside periphery of an obturator O ring 20. Wire member 27 is placed around the outside of circular member 18 with one end connected to the base 11 and the other end pulled taut over a pair of pulleys 32 by a weight 29. The extensometer 28 is connected to the wire member 27. Oil is poured into the cylinder 25 where it flows through the venting orifice into the unfilled portion 17 of trough 15 until it is level with obturator ring 20. The lid member 12 is placed on the base member 11 and bolted into place by bolts 13 and 14 thereby squeezing the obturator O ring 20 and the sealing O rings 23 and 24. By this method all the air is removed from the oil filled portion of trough 15. Additional oil is poured into sleeve member 25 and then plunger 26 is inserted into position. A small amount of pressure is exerted on the plunger member 26 so that the air in the cylinder is compressed into venting orifice 30. The air in the oil system is now removed by bleed valve 31. If desired, an electrical recorder may be used to record the radial expansion of the ring and the hydraulic pressure applied thereto. Pressure is now gradually applied to the plunger 26 in any well known manner, for example, by a Baldwin press.

The pressure on the obturator ring 20, steel bearings 19 and circular member 18 will be applied evenly and uniformly throughout the inside portion 17 of trough 15 by the oil therein. The pressure will cause the circular member 18 to expand evenly throughout the total circumference of the ring, which will give a true picture of the load required to break a cross sectional portion of the circular member.

The breaking of the circular member is usually indicated by an audible sound accompanied by a sudden drop in oil pressure. The modulus of elasticity may be calculated from the recorded data.

It is considered obvious that as various synthetic materials are developed and utilized in a circular or pipe configuration in missiles or other equipment having very high pressure, it is very desirable, if not essential, that the true tensile properties of these materials be known. Applicants' device provides this data easily and accurately and therefore has filled a longstanding need in the art.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A unitary hydraulic device for accurately testing the tensile properties of a circular ring member comprising a base means having a first circular trough therein for holding the ring member to be tested, lid means removably attached to said base means for providing a circular chamber of slightly larger width than the ring member located therein, circular sealing means located around the inside periphery of the ring member for providing a fluid tight chamber, a plurality of arcuate bearing members located in end-to-end relation between said sealing means and the ring member and each having a radius equal to the outside radius of said sealing means, piston means including a venting orifice from said piston means to said fluid tight chamber for providing a hydraulic pressure in said trough pressing uniformly against the said sealing means and bearing members to expand the ring member whereby the ring member may be tested by increasing the hydraulic pressure until the ring member is ruptured, means for measuring the hydraulic pressure just prior to the rupture of the ring member, and means for measuring the radial expansion of the ring member just prior to rupture.

2. The hydraulic device of claim 1 wherein the means for measuring the radial expansion of a ring member comprises a wire member wrapped once around the outside periphery of the ring member with one end thereof attached to said base means, the other end of the wire member passing through said base means over a pulley and being held taut by a weight member, and an extensometer attached to said other end of said wire member for measuring the movement of said wire member as a result of the expansion of the ring member under pressure.

References Cited in the file of this patent
UNITED STATES PATENTS

| | | |
|---|---|---|
| 1,332,571 | Ray | Mar. 2, 1920 |
| 1,513,610 | Laessker | Oct. 28, 1924 |
| 2,003,749 | Hughes | June 4, 1935 |
| 2,173,493 | Peters | Sept. 19, 1939 |
| 2,566,326 | Guillemin | Sept. 4, 1951 |
| 2,578,031 | Aubrey | Dec. 11, 1951 |

OTHER REFERENCES

Publication, "Detecting Distortion Caused by Pressure" by H. Van Zeebroeck; vol. 74, American Machinist, March 19, 1931, page 476.